Nov. 16, 1965  J. BARO  3,218,030
THUMB TACK STARTER AND REMOVER
Filed Sept. 26, 1963
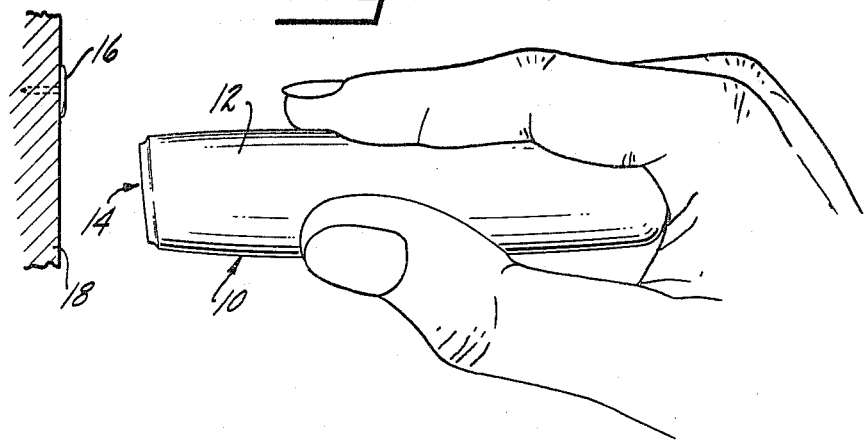
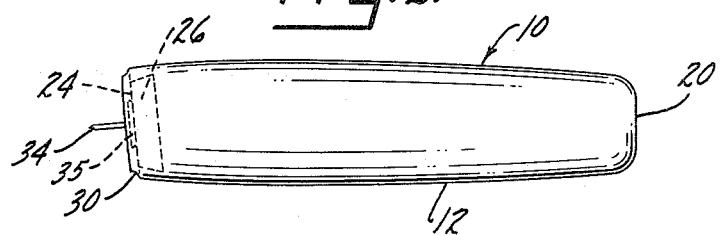
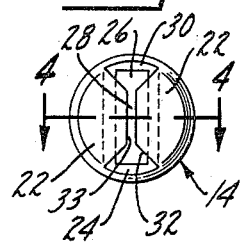
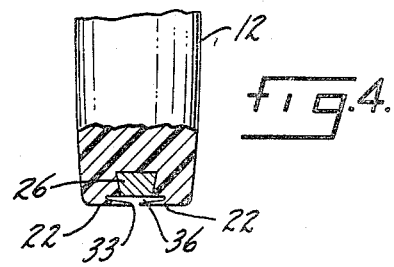
INVENTOR.
Joseph Baro,
BY Parker & Carter
Attorneys.

United States Patent Office 3,218,030
Patented Nov. 16, 1965

3,218,030
THUMB TACK STARTER AND REMOVER
Joseph Baro, 12026 Yale, Chicago, Ill.
Filed Sept. 26, 1963, Ser. No. 311,718
1 Claim. (Cl. 254—18)

This invention relates to a tool for removing thumb tacks and for placing them in anchoring material; it particularly relates to a manual tool by which thumb tacks are held in the tool either prior to insertion or after removal from an anchoring material.

An object of this invention is an inexpensive tool which can simply and neatly remove and start thumb tacks.

Another object is a simple manual tool which will releasably hold a thumb tack at its end in position so that its insertion may be started by manual pressure.

Another object is an inexpensive manual tool by which a thumb tack may be easily inserted and withdrawn from behind a retaining wall on the working end of the tool.

Another object is a tool by which thumb tack insertion may be started or removed by providing a permanent magnet for positioning and holding the thumb tack to the working end of the tool.

Another object is a tool having a working end in which a thumb tack may be easily introduced and withdrawn, the thumb tack being positioned by a magnet in the working end for initial insertion, and held thereby after withdrawal for later disposal.

The foregoing objects and other objects are realized by the invention which will be described in detail and which is shown in the accompanying drawings wherein:

FIGURE 1 is a side elevational view showing the tool just prior to the removal of a thumb tack;

FIGURE 2 is a side elevational view of the tool;

FIGURE 3 is a working end view of the tool; and

FIGURE 4 is a view along line 4—4 of FIGURE 3.

In FIGURE 1 the combined puller-starter is shown generally as 10. It is seen as having an elongated grasping portion or body section 12 and a front or working end generally designated as 14 which is provided with means for starting thumb-tack insertion and removing an inserted thumb-tack. The tool is shown positioned for removing tack 16 from an anchoring material such as wall 18.

The tool is preferably a one piece integrally molded plastic unit of suitable length for grasping. The elongated portion or body section 12 may be annular to facilitate grasping. A back end 20 defines the rear extension of the body section.

The front end 14 has a cap or paired retaining walls 22 spaced slightly from a blunt or straight surface 24. Such walls may be integrally molded with the body section. The straight surface is formed in part with the forward face of a permanent magnet 26 which is embedded or otherwise carried thereby. Such a permanent magnet may be formed with the one-piece tool by means of insert molding which is a process well known in the art. Generally, the insert is positioned in a mold and the plastic is injected around the insert.

The pair of retaining walls are spaced from each other in a central portion of the front end to define a longitudinal slot 28 which communicates with opposed openings such as 30. The openings are preferably tapered as at 32 to facilitate entry and removal of the head of a thumb tack. Edges 33 which define the opening, are also preferably tapered to form a substantially thin portion for easier placement under the head of the tack. The shank 34 of the pin extends outwardly from the slot when the head 35 of the tack is positioned in the space 36 between the retaining walls and the front end of the pin.

The use and operation of my invention are as follows:

To initially insert a tack, the flat head is fed through an opening or passageway 30 communicating with a longitudinal slot 28 in a cap spaced slightly from the straight end of the tube. The cap or pair of retaining walls form a space 36 with the straight surface 24 which will permit free movement of the flat head of the tack. The flat line of the head will be towards the straight surface. The metallic head of the tack will be positioned within the space by attraction to the permanent magnet in the working end.

The tip of the tack may be placed against the wall and partially inserted by pressure directed against the wall or other anchoring material. Once the tack is partially inserted, the tool is either raised or lowered to permit the circular edge of the head to move out of one of the communicating openings at the end of the slot. The tack may then be completely inserted by a hammer.

An inserted tack is removed by positioning the tool next to the exposed head of the tack. The head is moved to the opening by forcing the edges of the opening under the head of the tack until the shank of the tack enters the groove of the longitudinal slot. The head of the tack will then be within the space between the straight end of the tube and the retaining walls. A pulling force will then remove the tack from the anchoring material, and the removed tack will be held in the tool by the permanent magnet until disposed.

This foregoing arrangement in effect provides a neat and simple operation for starting tacks by a simple pushing pressure and removing tacks by a simple pulling force. It further permits tacks to be neatly held in position and they are therefore not lost or dropped or otherwise undesirably separated from the tool. The magnet, in addition to providing a force for positioning the head of the tack within the tool, also provides a hard surface for inserting the tack in the anchoring material.

While I have described a preferable one piece plastic molded tool with retaining walls or cap on the front head, it will be understood that a unit could be devised by providing an elongated handle portion of other material and attaching a separate cap or retaining wall to a front end. A socket could be formed in the front end of such a handle portion to receive a permanent magnet which is preferably recessed so that its straight face is substantially flush with the face of the front end of the tool. A one piece molded plastic unit is, however, preferred. This is especially true because of insert molding practice. A one-piece plastic unit is simple and economical to make; it has a pleasing appearance; and versatility is permitted in the choice of plastics and combinations of reinforcing materials for the plastic. For one piece molding, a tough plastic is desirable so that the retaining walls of the cap will have sufficient rigidity and body to stand up under the forces occurring in pushing or pulling the tool. Plastics may be selected such as polyesters reinforced with fiber glass. Reinforcing metal bands can be positioned inside the retaining walls as additional inserts in the molding process. Also, a separate cap could be molded from metal in which the front is formed in the manner described herein and the back is in the form of a socket to be frictionally fitted or otherwise fixed to one end of an elongated grasping portion. It is possible that the whole unit could be cast from metals, preferably lighter metals such as aluminum.

The foregoing invention can now be practiced by those skilled in the art. Such skilled persons will know that the invention is not necessarily restricted to the particular embodiments presented herein. The scope of the inven-

I claim:

A tool for inserting and removing thumb tacks which includes, in combination, an elongated handle portion, a working end having a substantially straight surface, a permanent solid magnet embedded in the working end substantially flush with the straight surface, said magnet providing a hard pushing surface for inserting thumb tacks and said magnet holding said tacks after their removal, a pair of rigid retaining walls joined to the tool at the working end and positioned in front of the straight surface, there being a longitudinal slot between the walls which connects with openings at the opposite ends of the rigid walls, said openings at the opposite ends of the rigid walls being tapered so as to permit easy placement of the tool under the head of the thumb tack, and the rigid walls spaced slightly from the straight surface so as to permit entry and removal of the head of a thumb tack between the permanent magnet and the retaining walls when the shank of the thumb tack is placed in the longitudinal slot.

References Cited by the Examiner

UNITED STATES PATENTS

| 50,899 | 11/1865 | Brownell | 254—21 |
| 2,177,232 | 10/1939 | Tinnerman | 81—3.04 |
| 2,666,201 | 1/1954 | Van Orden | 227—147 |
| 2,753,150 | 7/1956 | Gibson | 1—47 |
| 2,780,811 | 2/1957 | Rodin | 145—46 |

FOREIGN PATENTS

| 436,771 | 11/1926 | Germany. |
| 707,358 | 6/1941 | Germany. |
| 88,174 | 10/1956 | Norway. |
| 130,742 | 2/1951 | Sweden. |
| 125,247 | 11/1928 | Switzerland. |

DONLEY J. STOCKING, *Primary Examiner.*